(12) United States Patent
Chevalier et al.

(10) Patent No.: US 7,969,360 B2
(45) Date of Patent: Jun. 28, 2011

(54) HIGH RESOLUTION, ARBITRARY-EVEN-ORDER DIRECTION FINDING METHOD AND DEVICE

(75) Inventors: Pascal Chevalier, Courbevoie (FR); Anne Ferreol, Colombes (FR)

(73) Assignee: Thales (FR)

( * ) Notice: Subject to any disclaimer, the term of this patent is extended or adjusted under 35 U.S.C. 154(b) by 625 days.

(21) Appl. No.: 11/910,287

(22) PCT Filed: Mar. 31, 2006

(86) PCT No.: PCT/EP2006/061252
§ 371 (c)(1), (2), (4) Date: Jun. 9, 2008

(87) PCT Pub. No.: WO2006/103292
PCT Pub. Date: Oct. 5, 2006

(65) Prior Publication Data
US 2008/0266177 A1    Oct. 30, 2008

(30) Foreign Application Priority Data
Apr. 1, 2005   (FR) .................... 05 03180

(51) Int. Cl.
G01S 5/02   (2010.01)
(52) U.S. Cl. ................................. 342/417
(58) Field of Classification Search .......... 342/373, 342/386, 417
See application file for complete search history.

(56) References Cited

U.S. PATENT DOCUMENTS

| 6,658,234 B1 | 12/2003 | Dogan et al. |
| 6,718,184 B1 * | 4/2004 | Aiken et al. ............. 455/562.1 |
| 7,453,399 B2 * | 11/2008 | Ferreol et al. ............. 342/417 |
| 2005/0212703 A1 * | 9/2005 | Fiore et al. .............. 342/383 |

OTHER PUBLICATIONS

Chevalier, P. et al. "On the Virtual Array Concept for the Fourth-Order Direction Finding Problem." IEEE Transactions on Signal prcessing IEEE USA, vol. 47, No. 9, Sep. 1999, pp. 2592-2595, XP002355398, ISSN: 1053-587X.

Albera, L. et al. "Blind Identification of Overcomplete Mixtures of Sources (BIOME)." Linear Algebra and Its Applications, Elsevier Science Publishing Co., New York, NY, US, vol. 391, Nov. 1, 2004, pp. 3-30, XP004580007, ISSN: 0024-3795, pp. 6, 8, 17.

Dogan, M. C. et al. "Interpretation of Cumulants for Array Processing." Conference Record of the Twenty-Seventh Asilomar Conference on Signals, Systems and Computers (CAT. No. 93CH3312-6), IEEE Comput. Soc. Press Los Alamitos, CA, USA, vol. 2, 1993, pp. 1260-1264, SP002355423, ISBN: 0-8186-4120-7.

(Continued)

*Primary Examiner* — Thomas H Tarcza
*Assistant Examiner* — Nga X Nguyen
(74) *Attorney, Agent, or Firm* — Lowe Hauptman Ham & Berner, LLP (57) ABSTRACT

Method of high-resolution direction finding to an arbitrary even order, 2q (q>2), for an array comprising N narrowband antennas each receiving the contribution from P sources characterized in that the algebraic properties of a matrix of cumulants of order 2q, $C_{2q,x}(l)$, whose coefficients are the circular cumulants of order 2q, $\text{Cum}[x_{i_1}(t), \ldots, x_{i_q}(t), x_{i_{q+1}}(t)^*, \ldots, x_{i_{2q}}(t)^*]$, of the observations received on each antenna, for cumulant rankings indexed by l, are utilized to define a signal subspace and a noise subspace.

10 Claims, 2 Drawing Sheets

□ : Virtual Array   ⊗ : Real Array

OTHER PUBLICATIONS

Ferreol, A. et al. "Second-Order Blind Separation of First and Second Order Cyclostationary Sources-Application to AM, FSK, CPFSK and Deterministic Sources." IEEE Transactions on Signal Processing IEEE USA, vol. 52, No. 4, Apr. 2004, pp. 845-861, XP002355273, ISSN: 1053-587X.

G. Bienvenu, L. Kopp, "optimality of high resolution array processing using the eigensystem approach", IEEE Trans. Acou. Speech and Sign. Proc., vol. 31, No. 5, pp. 1235-1247, Oct. 1983.

J.P. Burg, "The relationship between maximum entropy spectra and maximum likelihood spectra", Geophysics, vol. 37, No. 2, pp. 375-376, Apr. 1972.

J. Capon, "High resolution frequency-wavenumber spectrum analysis", Proc. IEEE, vol. 57, No. 8, pp. 1408-1418, Feb. 1969.

P. Chevalier, A. Ferreol, "On the virtual array concept for the fourth-order direction finding problem", IEEE Trans. Signal Processing, vol. 47, No. 9, pp. 2592-2595, Sep. 1999.

R.T. Compton, Jr., "Adaptive Antennas—Concepts and Performance", Prentice Hall, Englewood Cliffs, New Jersey, 07632, 1988.

M.C. Dogan, J.M. Mendel, "Applications of cumulants to array processing—Part I: Aperture extension and array calibration", IEEE Trans. Signal Processing, vol. 43, No. 5, pp. 1200-1216, May 1995.

A. Ferreol, P. Chevalier, "On the behavior of current second and higher order blind source separation methods for cyclostationary sources", IEEE Trans. Signal Processing, vol. 48, No. 6, pp. 1712-1725, Jun. 2000. Errata vol. 50, No. 4, p. 990, Apr. 2002.

A. Ferreol, P. Chevalier, L. Albera, "Higher order blind separation of non zero-mean cyclostationary sources", Proc. EUSIPCO 02, Toulouse, (France), pp. 103-106, Sep. 2002.

A. Ferreol, P. Chevalier, L. Albera, "Second order blind separation of first and second order cyclostationary sources—Application to AM, FSK, CPFSK and Deterministic sources", IEEE Trans. Signal Processing, vol. 52, No. 4, pp. 845-861, Apr. 2004.

B. Friedlander, "A sensitivity analysis of the Music algorithm", IEEE Trans. Acou. Speech. and Signal Processing, vol. 38, No. 10, pp. 1740-1751, Oct. 1990.

P. McCullagh, "Tensor methods in Statistics", Chapman and Hall, Monographs on Statistics and applied Probability, 1987.

A. Paulraj, T. Kailath, "Eigenstructure methods for direction of arrival estimation in the presence of unknown noise field", IEEE Trans. Acou. Speech and Sign. Proc., vol. 34, No. 1, pp. 13-20, Feb. 1986.

B. Porat, B. Friedlander, "Direction finding algorithms based on higher order statistics", IEEE Trans. Signal Processing, vol. 39, No. 9, pp. 2016-2024, Sep. 1991.

R.O. Schmidt, "Multiple emitter location and signal parameter estimation", IEEE Trans. Ant. Prop., vol. 34, No. 3, pp. 276-280, Mar. 1986.

A.L. Swindlehurst, T. Kailath, "A performance analysis of subspaced-based methods in the presence of model errors, Part I: The Music algorithm", IEEE Trans. Signal Processing, vol. 40, No. 3, pp. 1758-1773, Jul. 1992.

Errata, Pascal Chevalier and Anne Ferreol, Correction to "On the Behavior of Current Second and Higher Order Blind Source Separation Methods for Cyclostationary Sources", IEEE Transactions on Signal Processing, vol. 50, No. 4, Apr. 2002.

\* cited by examiner

FIG.1

☐ : Virtual Array    ⊗ : Real Array

HIGH RESOLUTION, ARBITRARY-EVEN-ORDER DIRECTION FINDING METHOD AND DEVICE

CROSS-REFERENCE TO RELATED APPLICATIONS

The present Application is based on International Application No. PCT/EP2006/061252, filed on Mar. 31, 2006, which in turn corresponds to French Application No. 05 03180, filed on Apr. 1, 2005, and priority is hereby claimed under 35 USC §119 based on these applications. Each of these applications is hereby incorporated by reference in their entirety into the present application.

FIELD OF THE INVENTION

The present invention relates to a method of high-resolution direction finding to an arbitrary even order, that is to say exclusively utilizing the information contained in the statistics of order 2q of the observations, where q is an integer such that $q \geq 2$, preferably $q > 2$, for space, pattern and/or polarization diversity arrays.

BACKGROUND OF THE INVENTION

The invention finds its application notably in all systems which require a significant degree of spatial resolution [(environments with a large number of transmitters, array with a low number of sensors, significant residual model errors (standardization, calibration, etc.), etc.)].

At the start of the 80s, numerous order 2 direction finding procedures termed high-resolution (HR) [1] [14] were developed to alleviate the limitations of procedures that were termed super resolution [2-3] in relation to weak sources. Among these HR procedures, the so-called subspace procedures such as the MUSIC (or MUSIC-2) procedure [14] are the most popular. These HR procedures are very efficacious in a multi-source context insofar as they possess, in the absence of model errors and for background noise of known spatial coherence, unlimited asymptotic separating ability whatever the signal-to-noise ratio (SNR) of the sources. However, these HR procedures suffer from serious drawbacks. Specifically, they can process at most N−1 noncoherent sources on the basis of an array with N antennas and are not very robust either to model errors [10] [15], which are inherent in operational implementations, or to the presence of background noise of unknown spatial coherence [12], typical of the HF range for example. Furthermore, their performance can become greatly affected when this involves separating several weak and angularly close sources on the basis of a limited number of observed samples.

From the end of the 80s, mainly to alleviate the previous limitations, order 4 high-resolution direction finding procedures [13] have been developed for non-Gaussian sources, that are omnipresent in radiocommunications, among which the extension of the MUSIC procedure to order 4 [13], called MUSIC-4, is the most popular. Specifically, the order 4 procedures are asymptotically robust to the presence of Gaussian noise of unknown spatial coherence [13]. Furthermore, in spite of their greater variance, they generate a virtual increase in the aperture of the array and the number of antennas, introducing the notion of virtual array (RV) to order 4 [4] [6] and offering increased resolution and the possibility of processing a greater number of sources than the number of antennas. In particular, on the basis of an array with N antennas, the MUSIC-4 procedure can process up to N(N−1)+1 sources when the antennas are identical and up to (N+1)(N−1) sources for different antennas.

SUMMARY

The invention relates to a method of high-resolution direction finding to an arbitrary even order, 2q with $q > 2$, for an array comprising N narrowband antennas each receiving the contribution from P sources characterized in that the algebraic properties of a matrix of cumulants of order 2q, $C_{2q,x}(l)$, whose coefficients are the circular cumulants of order 2q, $\text{Cum}[x_{i_1}(t), \ldots, x_{i_q}(t), x_{i_{q+1}}(t)^*, \ldots, x_{i_{2q}}(t)^*]$, of the observations received on each antenna (for cumulant rankings indexed by l) are utilized to define a signal subspace and a noise subspace.

This method presents notably the advantage of increasing virtually, by creating virtual antennas, the aperture of the antenna arrays used and therefore of increasing the resolution, the processing capacity and the robustness to model errors of direction finding techniques in a manner that increases with q.

For rectilinear sources, the method according to the invention allows the creation of virtual antennas and aperture on the basis of the matrix of all the cumulants of order 2q of the observations, this allowing the processing of a number of sources that increases with q, on the basis of a given array of antennas.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Before detailing the steps implemented by the method, some data useful to an understanding of the invention is recalled.

We consider an array of N narrowband (NB) antennas, that are assumed identical initially, and we denote by x(t) the vector of the complex envelopes of the signals output by the antennas. Each antenna receives the contribution from P stationary centered NB sources, statistically independent or otherwise, and background noise. It is assumed that the P sources can be grouped into G sets, with $P_g$ sources in the set g, such that within a group, the sources are assumed to be statistically dependent, while the sources belonging to different sets are assumed to be statistically independent. In particular, G=P corresponds to the case where the P sources are statistically independent while G=1 corresponds to the case where all the sources are correlated. Of course, the parameters $P_g$ are such that:

$$P = \sum_{g=1}^{G} P_g \qquad (1)$$

Figure 1:
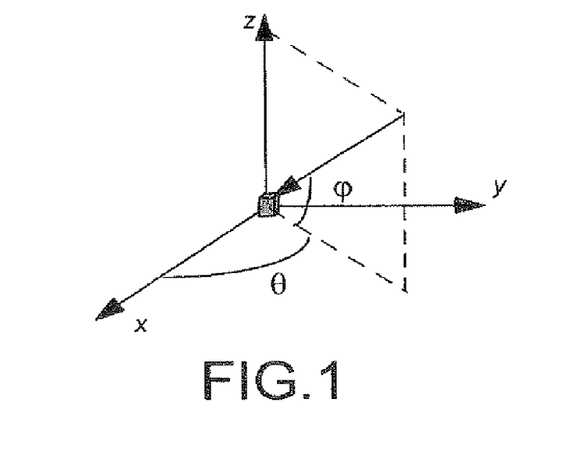
FIG. 1 the representation of an incident signal in three dimensions.

Under these assumptions, the observation vector can be written approximately $$x(t) \approx \sum_{i=1}^{P} m_i(t) a(\theta_i, \varphi_i) + v(t) = \Delta A m(t) + v(t) \qquad (2)$$

$$= \sum_{g=1}^{G} A_g m_g(t) + v(t)$$

$$= \sum_{g=1}^{G} x_g(t) + v(t)$$

where v(t) is the noise vector, assumed centered and Gaussian, m(t) is the vector whose components $m_i(t)$ are the complex envelopes of the sources, $\theta_i$ and $\phi_i$ are the angles of azimuth and elevation of source i (FIG. 1), A is the (N×P) matrix of the direction vectors of the sources $a(\theta_i, \phi_i)$ (1≤i≤P), which contains in particular all of the information relating to the directions of arrival of the sources, $A_g$ is the (N×$P_g$) sub-matrix of A relating to the gth group of sources, $m_g(t)$ is the associated ($P_g$×1) subvector of m(t) and $x_g(t) \Delta A_g m_g(t)$. In particular, in the absence of coupling between antennas, the component n of the vector $a(\theta_i, \phi_i)$, denoted $a_n(\theta_i, \phi_i)$, can be written, in the case of an array which utilizes only space diversity, in the following manner [5]

$$a_n(\theta_i, \phi_i) = \exp\{j2\pi[x_n \cos(\theta_i)\cos(\phi_i) + y_n \sin(\theta_i)\cos(\phi_i) + z_n \sin(\phi_i)]/\lambda\} \qquad (3)$$

where $\lambda$ is the wavelength and $(x_n, y_n, z_n)$ are the coordinates of antenna n.

The method according to the invention relies notably on the following idea: the MUSIC-2q procedure (q≥1) implemented according to the invention utilizes the information contained in the matrix of cumulants of order 2q ($N^q \times N^q$), $C_{2q,x}$, whose coefficients are the circular cumulants of order 2q of the observations, $\text{Cum}[x_{i_1}(t), \ldots, x_{i_q}(t), x_{i_{q+1}}(t)^*, \ldots, x_{i_{2q}}(t)^*]$ (1≤$i_j$≤N) (1≤j≤2q), where * corresponds to the complex conjugate.

These coefficients can be ranked in the matrix $C_{2q,x}$ in various ways, which determines in particular the resolution and the processing capacity of the MUSIC-2q procedure.

To parametrize these rankings, an arbitrary integer l is introduced such that (0≤l≤q) and the 2q-tuple, ($i_1, \ldots, i_q, i_{q+1}, \ldots, i_{2q}$), with indices $i_j$ (1≤j≤2q) is structured as 2 q-tuples indexed by l and defined respectively by ($i_1, i_2, \ldots, i_l, i_{q+1}, \ldots, i_{2q-l}$) and ($i_{2q-l+1}, \ldots, i_{2q}, i_{l+1}, \ldots, i_q$). When the indices $i_j$ (1≤j≤2q) vary from 1 to N, the previous 2 q-tuples take $N^q$ values. Numbering in a natural manner the $N^q$ values of each of these 2 q-tuples by respectively the integers $I_l$ and $J_l$, such that 1≤$I_l,J_l$≤$N^q$, we obtain:

$$I_l = \Delta \sum_{j=1}^{l} N^{q-j}(i_j - 1) + \sum_{j=1}^{q-l} N^{q-l-j}(i_{q+j} - 1) + 1 \qquad (4a)$$

$$J_l = \Delta \sum_{j=1}^{l} N^{q-j}(i_{2q-l+j} - 1) + \sum_{j=1}^{q-l} N^{q-l-j}(i_{l+j} - 1) + 1 \qquad (4b)$$

Using the property of invariance under permutation of the cumulants, we deduce that $\text{Cum}[x_{i_1}(t), \ldots, x_{i_q}(t), x_{i_{q+1}}(t)^*, \ldots, x_{i_{2q}}(t)^*] = \text{Cum}[x_{i_1}(t), \ldots, x_{i_l}(t), x_{i_{q+1}}(t)^*, \ldots, x_{i_{2q-l}}(t)^*, x_{i_{2q-l+1}}(t)^*, \ldots, x_{i_{2q}}(t)^*, x_{i_{l+1}}(t), \ldots, x_{i_q}(t)]$ and assuming that the latter quantity is the element $[I_l, J_l]$ of the matrix $C_{2q,x}$, thus denoted $C_{2q,x}(l)$, it is easy to show by using (2) that the matrix ($N^q \times N^q$) $C_{2q,x}(l)$ can be written in the following manner:

$$C_{2q,x}(l) \approx \sum_{g=1}^{G} C_{2q,x_g}(l) + \eta_2 V \delta(q-1) \qquad (5)$$

where $\eta_2$ is the average power of the noise per antenna, V is the (N×N) spatial coherence matrix of the noise such that Tr[V]=N, Tr[.] signifies Trace, $\delta(.)$ is the Kronecker symbol and the ($N^q \times N^q$) matrix $C_{2q,x_g}(l)$ corresponds to the matrix of the circular cumulants of order 2q of the vector $x_g(t)$ for the ranking indexed by l, and may be written:

$$C_{2q,x_g}(l) = [A_g^{\otimes l} \otimes A_g^{*\otimes(q-l)}] C_{2q,m_g}(l) [A_g^{*\otimes(q-l)}]^\dagger \qquad (6)$$

where $C_{2q,m_g}(l)$ is the ($P_g^q \times P_g^q$) matrix of the circular cumulants of order 2q of $m_g(t)$ for the ranking indexed by l, † corresponds to the conjugate transpose operation, $\otimes$ is the Kronecker product and $A_g^{\otimes l}$ is the ($N^l \times P_g^l$) matrix defined by $A_g^{\otimes l} = \Delta A_g \otimes A_g \otimes \ldots \otimes A_g$ with a number of Kronecker products equal to l−1.

In particular, for q=1 and l=1, the (N×N) matrix $C_{2q,x}(l)$ corresponds to the covariance matrix of the observations (insofar as the observations are centered) defined by $$R_x = \Delta C_{2,x}(1) = E[x(t)x(t)^\dagger] \approx \sum_{g=1}^{G} A_g C_{2,m_g}(1) A_g^\dagger + \eta_2 V \qquad (7)$$

For q=2 and l=1, the ($N^2 \times N^2$) matrix $C_{2q,x}(l)$ corresponds to the conventional quadricovariance matrix of the observations, defined by $$Q_x = \Delta C_{4,x}(1) \approx \sum_{g=1}^{G} [A_g \otimes A_g^*] C_{4,m_g}(1) [A_g \otimes A_g^*]^\dagger \qquad (8)$$

while for q=2 and l=2, the ($N^2 \times N^2$) matrix $C_{2q,x}(l)$ corresponds to an alternative expression for the quadricovariance matrix of the observations, defined by $$\tilde{Q}_x := \Delta C_{4,x}(2) \approx \sum_{g=1}^{G} [A_g \otimes A_g] C_{4,m_g}(2) [A_g \otimes A_g]^\dagger \qquad (9)$$

Figure 3:
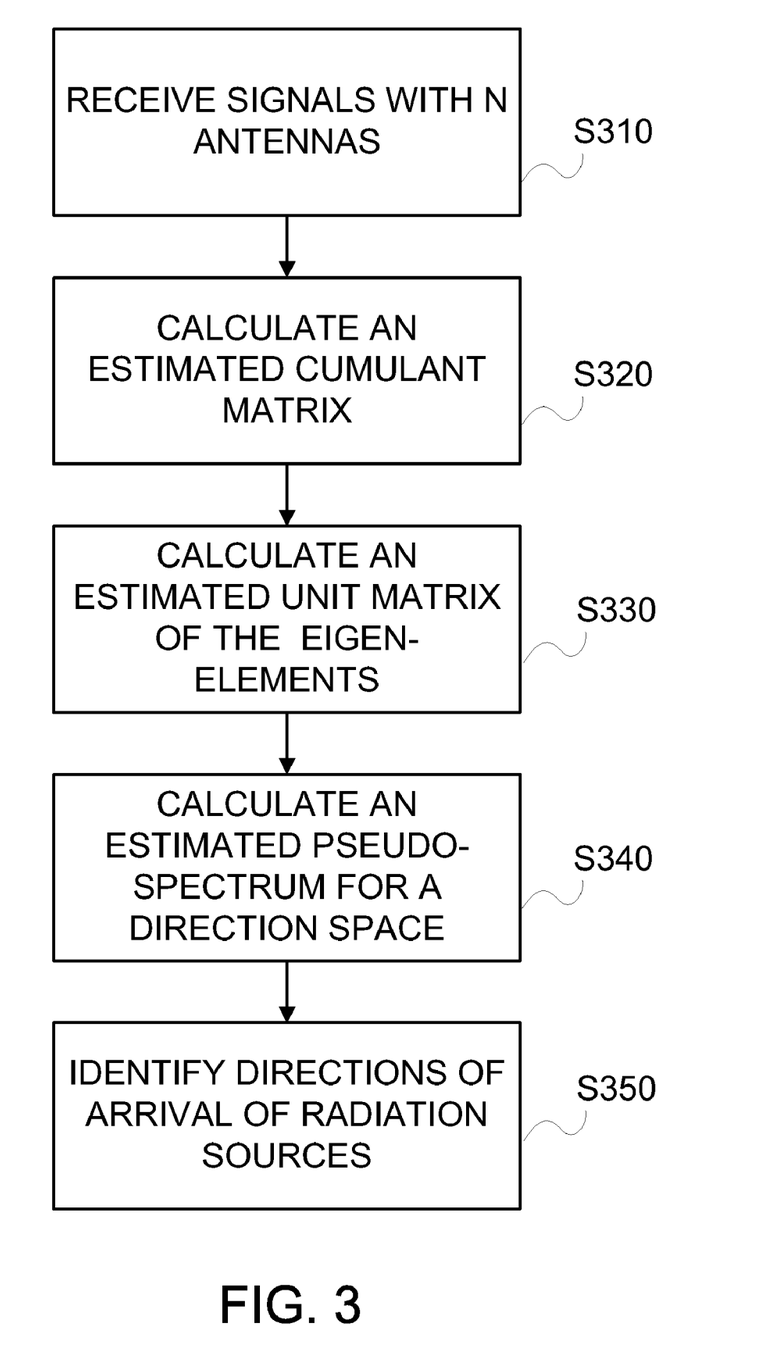
FIG. 3 is a flow chart of an example method of identifying directions of arrival according to some embodiments.

FIG. 3 is a flow chart of an example method of identifying directions of arrival by a processor according to some embodiments. According to some embodiments, signals are received by the N antennas and are arranged into a plurality of sampled vectors x(t) (S310). Then an estimated cumulant matrix for a cumulant matrix according to L sampled vectors are calculated (S320). Then the estimated matrix is decomposed into eigenelements, and an estimate unit matrix is calculated (S330). Then an estimated pseudo-spectrum for a direction space is derived accordingly (S340). Finally, the directions of arrival of the radiation sources are determined according to the pseudo-spectrum (S350). More details are explained below with specific embodiments.

Estimation

In practice, the statistics of order 2q of the observations, $\text{Cum}[x_{i_1}(t), \ldots, x_{i_q}(t), x_{i_{q+1}}(t)^*, \ldots, x_{i_{2q}}(t)^*]$, are unknown a priori and must be estimated on the basis of L samples of the observations, $x(k) \triangleq x(kT_e)$, $1 \leq k \leq L$, where $T_e$ is the sampling period.

For centered and stationary observations, using the ergodicity property, an asymptotically unbiased and consistent empirical estimator of the cumulants $\text{Cum}[x_{i_1}(t), \ldots, x_{i_q}(t), x_{i_{q+1}}(t)^*, \ldots, x_{i_{2q}}(t)^*]$ can be constructed on the basis of the well known Leonov-Shiryaev formula [11], giving the expression for a cumulant of order n of x(t) as a function of its moments of order p ($1 \leq p \leq n$), by replacing all the moments in the latter formula by their empirical estimate. More precisely, the Leonov-Shiryaev formula is given by:

$$\text{Cum}[x_{i_1}(t)^{\epsilon_1}, x_{i_2}(t)^{\epsilon_2}, \ldots, x_{i_n}(t)^{\epsilon_n}] = \sum_{p=1}^{n}(-1)^{p-1}(p-1)! \tag{10}$$

$$E\left[\prod_{j \in S1} x_{ij}(t)^{\epsilon j}\right] E\left[\prod_{j \in S2} x_{ij}(t)^{\epsilon j}\right] \ldots E\left[\prod_{j \in Sp} x_{ij}(t)^{\epsilon j}\right]$$

where (S1, S2, ..., Sp) describe all the partitions into p sets of (1, 2, ..., n), $\epsilon_j = \pm 1$ ($1 \leq p \leq n$) with the convention $x^1 = x$ and $x^{-1} = x^*$ and an empirical estimate of (10) is obtained by replacing all the moments $E[x_{i_1}(t)^{\epsilon_1} x_{i_2}(t)^{\epsilon_2} \ldots x_{i_p}(t)^{\epsilon_p}]$ ($1 \leq p \leq n$) in (10) by their empirical estimate given by:

$$\hat{E}[x_{i1}(t)^{\epsilon_1} x_{i2}(t)^{\epsilon_2} \ldots x_{ip}(t)^{\epsilon_p}](L) \triangleq \frac{1}{L}\sum_{k=1}^{L} x_{i1}(k)^{\epsilon_1} x_{i2}(k)^{\epsilon_2} \ldots x_{ip}(k)^{\epsilon_p} \tag{11}$$

However, in radiocommunications, most sources are not stationary but are cyclostationary (digital modulations). For cyclostationary centered observations, the statistics matrix defined by (5) becomes time dependent, denoted $C_{2q,x}(l)(t)$, and the method according to the invention can also be implemented by considering that $C_{2q,x}(l)$ is, in this case, the time average, $<C_{2q,x}(l)(t)>$, over an interval of infinite horizon, of the instantaneous statistics matrix, $C_{2q,x}(l)(t)$. Under these conditions, using the cyclo-ergodicity property, the matrix $C_{2q,x}(l)$ must be estimated on the basis of the observations by a nonempirical estimator such as that presented in [7] for q=2. This extension also applies to uncentered cyclostationary sources such as sources modulated with certain frequency modulations [9], provided that a nonempirical statistical estimator, such as that presented in [9] for q=1 and in [8] for q=2, is used.

The method according to the invention, or MUSIC-2q procedure comprises various steps and variant embodiments detailed hereinafter.

The properties of the covariance matrix of order 2q, $C_{2q,x}(l)$ are firstly analyzed and the MUSIC-2g algorithm for the ranking indexed by l is deduced therefrom.

Assumptions

To develop the MUSIC-2q algorithm for the ranking indexed by l, several assumptions presented hereinafter must be made:

H1: $P_g < N$, $1 \leq g \leq G$

H2: the matrix $A_g^{\otimes l} \otimes A_g^{*\otimes (q-l)}$ is of full rank $P_g^q$, $1 \leq g \leq G$ $$H3: P(G, q) = \triangleq \sum_{g=1}^{G} P_g^q < N^q$$

H4: the matrix $[A_1^{\otimes l} \otimes A_1^{*\otimes (q-l)}, \ldots, A_G^{\otimes l} \otimes A_G^{*\otimes (q-l)}]$ is of full rank P(G, q).

In particular, for statistically dependent sources (G=1), the assumptions H1 to H4 reduce to:

H1': $P < N$

H2': the matrix $A^{\otimes l} \otimes A^{*\otimes (q-l)}$ is of full rank $P^q$ while for statistically independent sources (G=P), the assumptions H1 to H4 reduce to:

H1'': $P < N^q$

H2'': the matrix $[a_1^{\otimes l} \otimes a_1^{*\otimes (q-l)}, \ldots, a_P^{\otimes l} \otimes a_P^{*\otimes (q-l)}]$ is of full rank P Properties of $C_{2q,x}(l)$ The $(P_g^q \times P_g^q)$ matrix $C_{2q,m_g}(l)$, which contains the circular cumulants of order 2q of $m_g(t)$ for the ranking indexed by l, is in general of full rank, $P_g^q$, insofar as the components of $m_g(t)$ are statistically dependent. Hence, using H1 and H2, the matrix $C_{2q,xg(l)}$ for $q>1$ also has the rank $P_g^q$. Under these conditions, we deduce from H4 that for q>1, the rank, $r_{2q,x}(l)$, of the matrix $C_{2q,x}(l)$ is equal to P(G, q) and such that $r_{2q,x}(l) < N^q$ according to H3. In particular, for sources which are all statistically dependent, $r_{2q,x(l)=P^q}$ while for statistically independent sources, $r_{2q,x}(l) = P$. Insofar as the matrix $C_{2q,x}(l)$ is Hermitian, but not positive definite, we deduce from the previous results that the matrix $C_{2q,x}(l)$ has P(G, q) nonzero eigenvalues and $N^q - P(G, q)$ zero eigenvalues.

The MUSIC-2q Algorithm

To construct an algorithm of MUSIC type on the basis of the matrix $C_{2q,x}(l)$, for q>1, we first calculate its eigenelement decomposition, given by $$C_{2q,x}(l) = U_{2q,s}(l) \Lambda_{2q,s}(l) U_{2q,s}(l)^\dagger + U_{2q,n}(l) \Lambda_{2q,n}(l) U_{2q,n}(l)^\dagger \tag{12}$$

where $\Lambda_{2q,s}(l)$ is the (P(G, q)×P(G, q)) diagonal matrix of the nonzero eigenvalues of $C_{2q,x}(l)$, $U_{2q,s}(l)$ is the ($N^q \times P(G, q)$) unit matrix of the eigenvectors of $C_{2q,x}(l)$ associated with the P(G, q) nonzero eigenvalues of $C_{2q,x}(l)$, $\Lambda_{2q,n}(l)$ is the (($N^q - P(G, q)$)×($N^q - P(G, q)$)) diagonal matrix of the zero eigenvalues of $C_{2q,x}(l)$ and $U_{2q,n}(l)$ is the ($N^q \times (N^q - P(G, q))$) unit matrix of the eigenvectors of $C_{2q,x}(l)$ associated with the ($N^q - P(G, q)$) zero eigenvalues of $C_{2q,x}(l)$. Insofar as $C_{2q,x}(l)$ is Hermitian, all the columns of $U_{2q,s}(l)$ are orthogonal to all the columns of $U_{2q,n}(l)$. Furthermore, insofar as $\text{Span}\{U_{2q,s}(l)\} = \text{Span}\{[A_1^{\otimes l} \otimes A_1^{*\otimes (q-l)}, \ldots, A_G^{\otimes l} \otimes A_G^{*\otimes (q-l)}]\}$, all the columns of all the matrices $A_g^{\otimes l} \otimes A_g^{*\otimes (q-l)}$, $1 \leq g \leq G$, are orthogonal to all the columns of $U_{2q,n}(l)$. Let us denote by ($\theta_{ig}, \phi_{ig}$) the direction of arrival of source i of group g. Under these conditions, the vector $a(\theta_{ig}, \phi_{ig})^{\otimes l} \otimes a(\theta_{ig}, \phi_{ig})^{*\otimes (q-l)}$ appears as column $[(1-P_g^q)(i-1)/(1-P_g)+1]$ of $A_g^{\otimes l} \otimes A_g^{*\otimes (q-l)}$. Hence, all the vectors $\{a(\theta_{ig}, \phi_{ig})^{\otimes l} \otimes a(\theta_{ig}, \phi_{ig})^{*\otimes (q-l)}, 1 \leq i \leq P_g, 1 \leq g \leq G\}$ are orthogonal to the columns of $U_{2q,n}(l)$ and are the only solutions of the following equation:

$$[a(\theta, \phi)^{\otimes l} \otimes a(\theta, \phi)^{*\otimes (q-l)}]^\dagger U_{2q,n}(l) U_{2q,n}(l)^\dagger [a(\theta, \phi)^{\otimes l} \otimes a(\theta, \phi)^{*\otimes (q-l)}] = 0 \tag{13}$$

which corresponds to the core of the MUSIC-2q algorithm for the ranking indexed by l. In practice, the matrix $U_{2q,s}(l)$ must be estimated on the basis of the observations and the directions of arrival of the sources must be estimated by searching for the minima of the left-hand side of equation (13). Insofar as, for space diversity arrays, the norm of the vector $[a(\theta, \phi)^{\otimes l} \otimes a(\theta, \phi)^{*\otimes (q-l)}]$ is independent of the direction of arrival, the first term on the left-hand side of equation (13) can be normalized by the term $[a(\theta, \phi)^{\otimes l} \otimes a(\theta, \phi)^{*\otimes (q-l)}]^\dagger [a(\theta, \phi)^{\otimes l} \otimes a(\theta, \phi)^{*\otimes (q-l)}]$ without changing the results of the algorithm.

The various steps of the MUSIC-2q algorithm for the ranking indexed by l are summarized hereinafter:

1. Estimation, $\hat{C}_{2q,x}(l)$, of the matrix $C_{2q,x}(l)$ on the basis of L sample vectors x(k), $1 \leq k \leq L$, by using an appropriate estimator of the circular cumulants of order 2q of the observations, 2. Decomposition of the matrix, $\hat{C}_{2q,x}(l)$, into eigenelements, and extraction of an estimate, $\hat{U}_{2q,n}(l)$, of the matrix $U_{2q,n}(l)$. This step may require an estimation of rank in the case where the number of sources and/or their degree of statistical dependency is unknown a priori.

3. Calculation of the estimated pseudo-spectrum $$\hat{P}_{Music-2q(l)}(\theta, \varphi) \underline{\underline{\Delta}} \frac{[a(\theta, \varphi)^{\otimes l} \otimes a(\theta, \varphi)^{*\otimes (q-l)}]^\dagger \hat{U}_{2q,n}(l) \hat{U}_{2q,n}(l)^\dagger [a(\theta, \varphi)^{\otimes l} \otimes a(\theta, \varphi)^{*\otimes (q-l)}]}{[a(\theta, \varphi)^{\otimes l} \otimes a(\theta, \varphi)^{*\otimes (q-l)}]^\dagger [a(\theta, \varphi)^{\otimes l} \otimes a(\theta, \varphi)^{*\otimes (q-l)}]} \quad (14)$$

for a given meshing of the space and search for the local minima. The search for the minima included for example a local interpolation about each of the local minima.

In certain cases, the number of sources P is known, such that P<N, but their degree of statistical dependency is not known. Under these conditions, $P(G, q) \leq P^q$ and a conservative approach for constructing $\hat{U}_{2q,n}(l)$ is to use only the $(N^q-P^q)$ eigenvectors of $\hat{C}_{2q,x}(l)$ that are associated with the smallest eigenvalues, thereby implicitly returning to the assumption that all the sources are statistically dependent.

The steps of the method according to the invention that were detailed previously for arbitrary non-Gaussian sources and space diversity arrays, can also be applied to the case of space, pattern and/or polarization diversity arrays as well as to the case where the sources possess a rectilinearity property that is known a priori and utilized in the algorithm.

Space, Pattern and/or Polarization Diversity Arrays

In the general case of an array comprising different antennas, that is to say of an array with pattern and/or polarization diversity in addition to or instead of space diversity, the direction vector of source i depends not only on the direction of arrival, $(\theta_i, \phi_i)$, of source i but also its polarization, $p_i$, where $p_i$ is a pair of parameters corresponding to the angles of polarization of source i in the waveplane. Under these conditions, the direction vector of source i, denoted $a(\theta_i, \phi_i, p_i)$, has a component n given by [5]

$$a_n(\theta_i, \phi_i, p_i) = f_n(\theta_i, \phi_i, p_i) \exp\{j2\pi[x_n \cos(\theta_i)\cos(\phi_i) + y_n \sin(\theta_i)\cos(\phi_i) + z_n \sin(\phi_i)]/\lambda\} \quad (15)$$

where $f_n(\theta_i, \phi_i, p_i)$ is the complex response of antenna n to an electric field originating from the direction $(\theta_i, \phi_i)$ and having the polarization state $p_i$.

Under these assumptions, the MUSIC-2q algorithm described in the previous paragraph applies in the same manner to arrays utilizing pattern and polarization diversity, but with an estimated pseudo-spectrum that depends on the polarization parameter p and is given by:

$$\hat{P}_{Music-2q(l)}(\theta, \varphi, p) \underline{\underline{\Delta}} \frac{[a(\theta, \varphi, p)^{\otimes l} \otimes a(\theta, \varphi, p)^{*\otimes (q-l)}]^\dagger \hat{U}_{2q,n}(l) \hat{U}_{2q,n}(l)^\dagger [a(\theta, \varphi, p)^{\otimes l} \otimes a(\theta, \varphi, p)^{*\otimes (q-l)}]}{[a(\theta, \varphi, p)^{\otimes l} \otimes a(\theta, \varphi, p)^{*\otimes (q-l)}]^\dagger [a(\theta, \varphi, p)^{\otimes l} \otimes a(\theta, \varphi, p)^{*\otimes (q-l)}]} \quad (16)$$

In the case of an array utilizing pattern and polarization diversities, the pseudo-spectrum is normalized by the term $$[a(\theta, \phi, p)^{\otimes l} \otimes a(\theta, \phi, p)^{*\otimes (q-l)}]^\dagger [a(\theta, \phi, p)^{\otimes l} \otimes a(\theta, \phi, p)^{*\otimes (q-l)}]$$

so as to render the pseudo-spectrum constant with respect to directions in the absence of sources.

Hence, under the assumption of control of the responses of the antennas in terms of direction and polarization (for example by calibrating the array in terms of direction and polarization), the search for the minima of the pseudo-spectrum, $\hat{P}_{2q-Music(l)}(\theta, \phi, p)$, demands a meshing not only of the direction space $(\theta, \phi)$ but also of the polarization space p, followed by an interpolation in the neighborhoods of the minima, thereby representing a considerable cost. One way to circumvent the meshing of the polarization space is to utilize the fact that a polarization wave p can be decomposed into the weighted sum of two waves with orthogonal polarizations, $p_1$ and $p_2$. Under these conditions, the direction vector $a(\theta, \phi, p)$ becomes a linear combination of the direction vectors $a(\theta, \phi, p_1)$ and $a(\theta, \phi, p_2)$ relating to these two polarizations such that:

$$a(\theta, \phi, p) = \alpha_1 a(\theta, \phi, p_1) + \alpha_2 a(\theta, \phi, p_2) = A_{12}(\theta, \phi) \alpha(p) \quad (17)$$

where $\alpha_1$ and $\alpha_2$, such that $\alpha_1^2 + \alpha_2^2 = 1$, are the real coefficients of the decomposition of the incident field into a sum of two orthogonally polarized fields, $\alpha(p)$ is the (2×1) vector of components $\alpha_1$ and $\alpha_2$ and $A_{12}(\theta, \phi)$ is the (N×2) matrix defined by $A_{12}(\theta, \phi) \underline{\underline{\Delta}} [a(\theta, \phi, p_1), a(\theta, \phi, p_2)]$.

Using the fact that $(\overline{X} Y) \otimes (Z W) = (X \otimes Z)(Y \otimes W)$, we deduce from (17) that $$a(\theta, \varphi, p)^{\otimes l} \otimes a(\theta, \varphi, p)^{*\otimes (q-l)} = [A_{12}(\theta, \varphi)^{\otimes l} \otimes A_{12}(\theta, \varphi)^{*\otimes (q-l)}] \quad (18)$$

$$[\alpha(p)^{\otimes l} \otimes \alpha(p)^{*\otimes (q-l)}] = \underline{\underline{\Delta}} A_{12,q,l}(\theta, \varphi) \alpha_{q,l}(p)$$

where $A_{12,q,l}(\theta, \phi)$ is the ($N^q \times 2^q$) matrix defined by $A_{12,q,l}(\theta, \phi) \underline{\underline{\Delta}} [A_{12}(\theta, \phi)^{\otimes l} \otimes A_{12}(\theta, \phi)^{*\otimes (q-l)}]$ and where $\alpha_{q,l}(p)$ is the $(2^q \times 1)$ vector defined by $\alpha_{q,l}(p) \underline{\underline{\Delta}} [\alpha(p)^{\otimes l} \otimes \alpha(p)^{*\otimes (q-l)}]$. Under these conditions, the pseudo-spectrum (16) takes the form:

$$\hat{P}_{Music-2q(l)}(\theta, \varphi, p) \underline{\underline{\Delta}} \frac{\alpha_{q,l}(p)^\dagger A_{12,q,l}(\theta, \varphi)^\dagger \hat{U}_{2q,n}(l) \hat{U}_{2q,n}(l)^\dagger A_{12,q,l}(\theta, \varphi) \alpha_{q,l}(p)}{\alpha_{q,l}(p)^\dagger A_{12,q,l}(\theta, \varphi)^\dagger A_{12,q,l}(\theta, \varphi) \alpha_{q,l}(p)} \quad (19)$$

and the use in (19) of the vector $\alpha_{q,l}(p)$ which minimizes (19) culminates in a pseudo-spectrum that now depends only on the direction of arrival and is given by:

$$\hat{P}_{2q-Music(l)}(\theta, \phi) = \lambda_{min}[(A_{12,q,l}(\theta, \phi)^\dagger A_{12,q,l}(\theta, \phi))^{-1} A_{12,q,l}(\theta, \phi)^\dagger \hat{U}_{2q,n}(l) \hat{U}_{2q,n}(l)^\dagger A_{12,q,l}(\theta, \phi)] \quad (20)$$

where $\lambda_{min}[X]$ corresponds to the minimum eigenvalue of the matrix X. The estimated directions of the sources, $(\hat{\theta}_i, \hat{\phi}_i)$ ($1 \leq i \leq P$), correspond to the local mimima of (20), which have to be searched for by controlling the direction vectors $a(\theta, \phi, p_1)$ and $a(\theta, \phi, p_2)$ in the two polarizations $p_1$ and $p_2$ (by calibration for example), meshing the direction of arrival space followed by an interpolation about the minima.

An estimation, $\hat{\alpha}_{q,l}(p_i)$, of the vector $\alpha_{q,l}(p_i)$ associated with source i is then given by the eigenvector of the matrix $(A_{12,q,l}(\hat{\theta}_i,\hat{\phi}_i)^\dagger A_{12,q,l}(\hat{\theta}_i,\hat{\phi}_i))^{-1} A_{12,q,l}(\hat{\theta}_i,\hat{\phi}_i)^\dagger \hat{U}_{2q,n}(l) \hat{U}_{2q,n}(l)^\dagger A_{12,q,l}(\hat{\theta}_i,\hat{\phi}_i)$ that is associated with the minimum eigenvalue. By decomposing the vector $\hat{\alpha}_{q,l}(p_i)$ into $2^{q-2}$ (4×1) subvectors, $\hat{\alpha}_{q,l,s}(p_i)$, $1 \leq s \leq q-2$, we obtain $\hat{\alpha}_{q,l}(p_i) = [\hat{\alpha}_{q,l,1}(p_i)^T, \ldots, \hat{\alpha}_{q,l,(q-2)}(p_i)^T]^T$. It is then easy to verify that the subvector $\hat{\alpha}_{q,l,s}(p_i)$ is an estimate of the vector $\alpha_{q,l,s}(p_i)$, which is proportional to:

$$\alpha(p_i) \otimes \alpha(p_i) \text{ if } q-l=0 \quad (21a)$$

$$\alpha(p_i) \otimes \alpha(p_i)^* \text{ if } q-l=1 \quad (21b)$$

$$\alpha(p_i)^* \otimes \alpha(p_i)^* \text{ if } q-l>1 \quad (21c)$$

Under these conditions, by arranging the components of the vector $\hat{\alpha}_{q,l,s}(p_i)$ in a (2×2) matrix $\hat{\Gamma}_{q,l,s}(p_i)$ such that $\hat{\Gamma}_{q,l,s}(p_i)[k,j] = \hat{\alpha}_{q,l,s}(p_i)[2(k-1)+j]$, where $\hat{\Gamma}_{q,l,s}(p_i)[k,j]$ and $\hat{\alpha}_{q,l,s}(p_i)[k]$ are the element [k, j] and the component k respectively of the matrix $\hat{\Gamma}_{q,l,s}(p_i)$ and of the vector $\hat{\alpha}_{q,l,s}(p_i)$, the matrix $\hat{\Gamma}_{q,l,s}(p_i)$ becomes, to within a scalar, an estimate of the matrix $\Gamma_{q,l,s}(p_i)$ defined by:

$$\Gamma_{q,l,s}(p_i) = \alpha(p_i) \alpha(p_i)^T \text{ if } q-l=0 \quad (22a)$$

$$\Gamma_{q,l,s}(p_i) = \alpha(p_i) \alpha(p_i)^\dagger \text{ if } q-l=1 \quad (22b)$$

$$\Gamma_{q,l,s}(p_i) = \alpha(p_i)^* \alpha(p_i)^\dagger \text{ if } q-l>1. \quad (22c)$$

It then suffices to jointly diagonalize the matrices $\hat{\Delta}_{q,l,s}(p_i)$, $1 \leq s \leq q-2$, to obtain an estimate, $\hat{\alpha}(p_i)$, of $\alpha(p_i)$ which corresponds to the eigenvector associated with the maximum eigenvalue, where $\hat{\Delta}_{q,l,s}(p_i)$ is defined by:

$$\hat{\Delta}_{q,l,s}(p_i) = \hat{\Gamma}_{q,l,s}(p_i) \hat{\Gamma}_{q,l,s}(p_i)^\dagger \text{ if } q-l=0 \quad (23a)$$

$$\hat{\Delta}_{q,l,s}(p_i) = \hat{\Gamma}_{q,l,s}(p_i) \hat{\Gamma}_{q,l,s}(p_i)^\dagger \text{ if } q-l=1 \quad (23b)$$

$$\hat{\Delta}_{q,l,s}(p_i) = \hat{\Gamma}_{q,l,s}(p_i)^* \hat{\Gamma}_{q,l,s}(p_i)^T \text{ if } q-l>1 \quad (23c)$$

Case of Rectilinear Sources

For noncircular observations to order 2q, we utilize the $(2^q N^q \times 2^q N^q)$ matrix, $C_{2q,xe}$, of cumulants of order 2q of the extended observation vector (2N×1) $x_e(t) \triangleq [x(t)^T, x(t)^\dagger]^T$, whose coefficients are the circular cumulants of order 2q of the vector $x_e(t)$, $\mathrm{Cum}[x_{ei_1}(t), \ldots, x_{ei_q}(t), x_{ei_{q+1}}(t)^*, \ldots, x_{ei_{2q}}(t)^*]$ ($1 \leq i_j \leq 2N$) ($1 \leq j \leq 2q$). These cumulants of order 2q can be ranked in various ways, indexed by the integer l, in the matrix $C_{2q,xe}$, which is denoted, for the ranking indexed by l, $C_{2q,xe}(l)$.

A particular family of noncircular sources to order 2q corresponds to rectilinear sources, characterized by the fact that their complex envelope is real, this being in particular the case for amplitude modulated (AM, ASK) sources or 2-state phase modulated (BPSK) sources. For P sources all rectilinear, under the assumptions stated previously, the expression for the vector $x_e(t)$ is deduced from (2) and is given by:

$$x_e(t) \approx \sum_{i=1}^{P} m_i(t) a_e(\theta_i, \varphi_i, \phi_i) + v_e(t) \underline{\Delta} A_e m(t) + v_e(t) \quad (24)$$

$$= \sum_{g=1}^{G} A_{eg} m_g(t) + v_e(t) = \sum_{g=1}^{G} x_{eg}(t) + v_e(t)$$

where $v_e(t) \triangleq [v(t)^T, v(t)^\dagger]^T$, $a_e(\theta_i, \phi_i, \Phi_i) \triangleq [e^{j\Phi_i} a(\theta_i, \phi_i)^T, e^{-j\Phi_i} a(\theta_i, \phi_i)^\dagger]^T$, $\overline{\Phi_i}$ is the phase of the propagation channel associated with source i, $A_e$ is the (2N×P) matrix of the vectors $a_e(\theta_i, \phi_i, \Phi_i)$ ($1 \leq i \leq P$), $A_{eg}$ is the (2N×$P_g$) sub-matrix of $A_e$ relating to the gth group of sources and $x_{eg}(t) \triangleq A_{eg} m_g(t)$. The model (24) is similar to the model (2), in which the extended (2N×1) direction vectors, $a_e(\theta_i, \phi_i, \Phi_i)$, have replaced the (N×1) direction vectors, $a(\theta_i, \phi_i)$. In this context, under conditions C1 to C4 presented hereinafter:

C1: $P_g < 2N$, $1 \leq g \leq G$

C2: the matrix $A_{eg}^{\otimes l} \otimes A_{eg}^{*\otimes (q-l)}$ is of full rank $P_g^q$, $1 \leq g \leq G$ $$C3: P(G,q) \triangleq \sum_{g=1}^{G} P_g^q < 2^q N^q$$

C4: the matrix $[A_{e1}^{\otimes l} \otimes A_{e1}^{*\otimes (q-l)}, \ldots, A_{eG}^{\otimes l} \otimes A_{eG}^{*\otimes (q-l)}]$ is of full rank P(G, q) and by using similar reasoning to that set out above regarding the properties of the matrix and the Music-2q algorithm, but on the basis of the matrix $C_{2q,xe}(l)$, we culminate in the MUSIC-2q algorithm for rectilinear sources, denoted MUSIC-2q-REC, and for the ranking indexed by l, whose steps are summarized hereinafter:

1. Estimation, $\hat{C}_{2q,xe}(l)$, of the matrix $C_{2q,xe}(l)$ on the basis of L sample vectors x(k), $1 \leq k \leq L$, by using an appropriate estimator of the circular cumulants of order 2q of the observations.

2. Decomposition of the matrix, $\hat{C}_{2q,xe}(l)$, into eigenelements, and extraction of an estimate, $\hat{U}_{2q,en}(l)$, of the matrix $U_{2q,en}(l)$ of the eigenvectors of the noise space of the matrix $C_{2q,xe}(l)$. This step may require an estimation of rank in the case where the number of sources and/or their degree of statistical dependency is unknown a priori.

3. Calculation of the estimated pseudo-spectrum $$\hat{P}_{Music\text{-}2q\text{-}rec(l)}(\theta, \varphi, \phi) \triangleq \frac{[a_e(\theta, \varphi, \phi)^{\otimes l} \otimes a_e(\theta, \varphi, \phi)^{*\otimes (q-l)}]^\dagger \hat{U}_{2q,en}(l) \hat{U}_{2q,en}(l)^\dagger [a_e(\theta, \varphi, \phi)^{\otimes l} \otimes a_e(\theta, \varphi, \phi)^{*\otimes (q-l)}]}{[a_e(\theta, \varphi, \phi)^{\otimes l} \otimes a_e(\theta, \varphi, \phi)^{*\otimes (q-l)}]^\dagger [a_e(\theta, \varphi, \phi)^{\otimes l} \otimes a_e(\theta, \varphi, \phi)^{*\otimes (q-l)}]} \quad (25)$$

for a given meshing of the direction space ($\theta$, $\phi$) and of the phase space $\Phi$ and search for the local minima (including a local interpolation about each of the local minima).

According to a variant embodiment, one way to circumvent the meshing of the phase space is to utilize the fact that the extended direction vector $a_e(\theta, \phi, \Phi)$ can be written:

$$a_e(\theta, \phi, \Phi) = \tilde{a}_e(\theta, \phi) \beta(\Phi) \quad (26)$$

where $\beta(\Phi)$ is the (2×1) vector defined by $\beta(\Phi) \underline{\Delta} [e^{j\Phi}, e^{-j\Phi}]^T$ and $\tilde{A}_e(\theta, \phi)$ is the (2N×2) matrix defined by $$\tilde{A}_e(\theta, \varphi) \underline{\Delta} \begin{bmatrix} a(\theta, \varphi) & 0 \\ 0 & a(\theta, \varphi)^* \end{bmatrix} \quad (27)$$

where o is the zero vector of dimension (N×1). Using the fact that $(X\,Y) \otimes (Z\,W) = (X \otimes Z)(Y \otimes W)$, we deduce from (26) that:

$$a_e(\theta, \phi, \Phi)^{\otimes\,l} \otimes a_e(\theta, \phi, \Phi)^{*\otimes\,(q-l)} = [\tilde{A}_e(\theta, \phi)^{\otimes\,l} \otimes \tilde{A}_e(\theta, \phi)^{*\otimes\,(q-l)}][\beta(\Phi)^{\otimes\,l} \otimes \beta(\Phi)^{*\otimes\,(q-l)}] \underline{\Delta} \tilde{A}_{e,q,l}(\theta, \phi)\,\beta_{q,l}(\Phi) \quad (28)$$

where $\tilde{A}_{e,q,l}(\theta, \phi)$ is the $(2^q N^q \times 2^q)$ matrix defined by $\tilde{A}_{e,q,l}(\theta, \phi) \underline{\Delta} [\tilde{A}_e(\theta, \phi)^{\otimes\,l} \otimes \tilde{A}_e(\theta, \phi)^{*\otimes\,(q-l)}]$ and where $\beta_{q,l}(\Phi)$ is the $(2^q \times 1)$ vector defined by $\beta_{q,l}(\Phi) \underline{\Delta}[\beta(\Phi)^{\otimes\,l} \otimes \beta(\Phi)^{*\otimes\,(q-l)}]$. Under these conditions, by using the reasoning of the previous paragraph on phase diversity arrays, the pseudo-spectrum (25) takes the form:

$$\hat{P}_{Music-2q\text{-}rec(l)}(\theta,\phi) = \lambda_{min}[(\tilde{A}_{e,q,l}(\theta, \phi)^\dagger \tilde{A}_{e,q,l}(\theta, \phi))^{-1} \tilde{A}_{e,q,l}(\theta, \phi)^\dagger \hat{U}_{2q,en}(l)\hat{U}_{2q,en}(l)^\dagger \tilde{A}_{e,q,l}(\theta, \phi)] \quad (29)$$

The estimated directions of the sources, $(\hat{\theta}_i, \hat{\phi}_i)$ $(1 \leq i \leq P)$, correspond to the local mimima of (29), which have to be searched for by controlling the direction vector $a(\theta, \phi)$ and meshing the direction of arrival space solely, followed by an interpolation about the minima.

An estimation, $\hat{\beta}_{q,l}(\Phi_i)$, of the vector $\beta_{q,l}(\Phi_i)$ associated with source i is then given by the eigenvector of the matrix $(\tilde{A}_{e,q,l}(\hat{\theta}_i, \hat{\phi}_i)^\dagger \tilde{A}_{e,q,l}(\hat{\theta}_i, \hat{\phi}_i))^{-1} \tilde{A}_{e,q,l}(\hat{\theta}_i, \hat{\phi}_i)^\dagger \hat{U}_{2q,en}(l) \hat{U}_{2q,en}(l)^\dagger \tilde{A}_{e,q,l}(\hat{\theta}_i, \hat{\phi}_i)$ that is associated with the minimum eigenvalue.

The MUSIC-2q-REC algorithm can also be implemented on the basis of polarization diversity arrays on the basis of meshing just the direction space.

Identifiability

It can be shown that the order 2q antenna processing problem for P non-Gaussian and statistically independent sources on the basis of an array of N antennas with coordinates $(x_n, y_n, z_n)$ and responses $f_n(\theta, \phi, p)$, $1 \leq n \leq N$, is, for the ranking indexed by l, $C_{2q,x}(l)$, similar to a second-order antenna processing problem for which these P statistically independent sources are incident, with a virtual power $c_{2q,m_i}$ $(1 \leq i \leq P)$, on a virtual array of $N^q$ VAs with coordinates $(x^l_{k_1 k_2 \ldots k_q}, y^l_{k_1 k_2 \ldots k_q}, z^l_{k_1 k_2 \ldots k_q})$ and responses $f^l_{k_1 k_2 \ldots k_q}(\theta, \phi, p)$, $1 \leq k_j \leq N$ for $1 \leq j \leq q$, of which in general $N^l_{2q}$ are different, defined respectively by:

$$\left(x^l_{k_1 k_2 \ldots k_q}, y^l_{k_1 k_2 \ldots k_q}, z^l_{k_1 k_2 \ldots k_q}\right) = \quad (30)$$

$$\left(\sum_{j=1}^{l} x_{k_j} - \sum_{u=1}^{q-l} x_{k_{l+u}}, \sum_{j=1}^{l} y_{k_j} - \sum_{u=1}^{q-l} y_{k_{l+u}}, \sum_{j=1}^{l} z_{k_j} - \sum_{u=1}^{q-l} z_{k_{l+u}}\right)$$

$$f^l_{k_1 k_2 \ldots k_q}(\theta, \varphi, p) = \prod_{j=1}^{l}\prod_{u=1}^{q-l} f_{k_j}(\theta, \varphi, p) f_{k_{l+u}}(\theta, \varphi, p)^* \quad (31)$$

Thus antenna processing to higher orders can be used to replace antennas and hardware and thus decrease the overall cost of the system.

Figure 2:
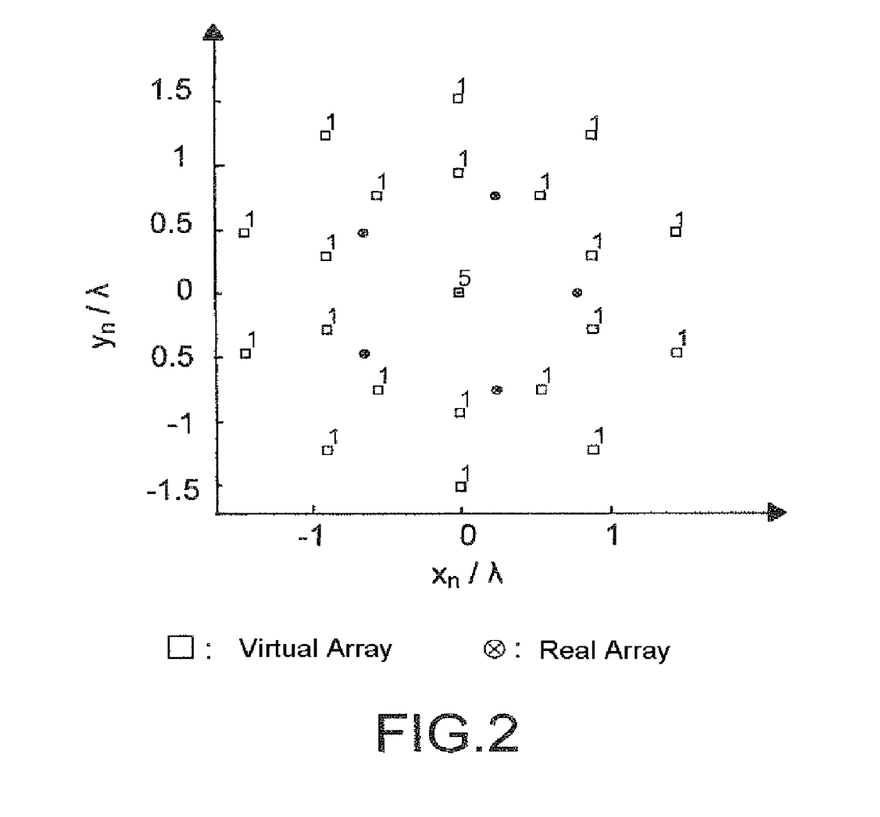
FIG. 2 a virtual array of order 4 of a uniform circular array of 5 antennas with the order of multiplicity of the virtual antennas.

To illustrate this notion, FIG. 2 presents the virtual array associated with a uniform circular array of 5 antennas of radius $R=0.8\,\lambda$, jointly with the order of multiplicity of the virtual antennas (that is to say of the number of virtual sensors corresponding to this antenna) for (q, l)=(3, 2). In this typical case $N^l_{2q}=55$.

Utilization of $C_{2q,xe}(l)$ and Rectilinear Sources

The previously mentioned theory of virtual arrays applies to the problem of the antenna processing to order 2q for rectilinear sources utilizing the information contained in the matrix, $C_{2q,xe}(l)$, of all the cumulants of order 2q of the observations for the ranking indexed by l by replacing the initial N-antenna array with the 2N-antenna virtual array associated with the extended observations. We then denote by $N^l_{2q,e}$ the number of different VAs of the virtual array of order 2q for the ranking indexed by l associated with the antenna processing problem for rectilinear sources utilizing all the cumulants of order 2q of the observations.

Performance of the MUSIC-2q Algorithm

We deduce from the previous results that the number of non-Gaussian and statistically independent sources that can be processed by the MUSIC-2q algorithm for the ranking indexed by l is $\text{Inf}(N^l_{2q}, N^q-1)$.

Tables 1 and 2 present an upper bound, $N_{max}[2q, l]$, of $N^l_{2q}$, for polarization diversity and space diversity arrays respectively, attained for arrays not having any particular symmetry.

Performance of the MUSIC-2q-REC Algorithm

Similar reasoning to the above shows that the number of non-Gaussian and statistically independent sources that can be processed by the MUSIC-2q-REC algorithm for the ranking indexed by l is $\text{Inf}(N_{2q,e}^l, 2^q N^q-1)$.

TABLE 1

$N_{max}[2q, l]$ as a function of N for several values of q and l and for space and polarization diversity arrays.

| m = 2q | l | $N^l_{max}[2q, l]$ |
|---|---|---|
| 4 | 2 | N(N + 1)/2 |
| (q = 2) | 1 | $N^2$ |
| 6 | 3 | N!/[6(N − 3)!] + N(N − 1) + N |
| (q = 3) | 2 | N!/[2(N − 3)!] + 2N(N − 1) + N |
| 8 | 4 | N!/[24(N − 4)!] + N!/[2(N − 3)!] + 1.5N(N − 1) + N |
| (q = 4) | 3 | N!/[6(N − 4)!] + 1.5N!/(N − 3)!] + 3N(N − 1) + N |
|  | 2 | N!/[4(N − 4)!] + 2N!/(N − 3)!] + 3.5N(N − 1) + N |

TABLE 1

$N_{max}[2q, l]$ as a function of N for several values of q and l and for space diversity arrays.

| m = 2q | l | $N^l_{max}[2q, l]$ |
|---|---|---|
| 4 | 2 | N(N + 1)/2 |
| (q = 2) | 1 | $N^2$ − N + 1 |
| 6 | 3 | N!/[6(N − 3)!] + N(N − 1) + N |
| (q = 3) | 2 | N!/[2(N − 3)!] + N(N − 1) + N |
| 8 | 4 | N!/[24(N − 4)!] + N!/[2(N − 3)!] + 1.5N(N − 1) + N |
| (q = 4) | 3 | N!/[6(N − 4)!] + N!/(N − 3)! + 1.5N(N − 1) + N |
|  | 2 | N!/[4(N − 4)!] + N!/(N − 3)! + 2N(N − 1) + 1 |

The invention relates notably to a device for high-resolution direction finding to an arbitrary even order, 2q, with q>2 disposed in an array comprising N narrowband antennas each receiving the contribution from P sources, the device comprising a processor suitable for executing the steps of the method described above.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

REFERENCES

[1] G. BIENVENU, L. KOPP, "optimality of high resolution array processing using the eigensystem approach", *IEEE Trans. Acou. Speech and Sign. Proc.*, Vol. 31, No. 5, pp. 1235-1247, October 1983.

[2] J. P. BURG, "The relationship between maximum entropy spectra and maximum likelihood spectra", *Geophysics*, Vol. 37, No. 2, pp. 375-376, April 1972.

[3] J. CAPON, "High resolution frequency-wavenumber spectrum analysis", *Proc. IEEE*, Vol. 57, No. 8, pp. 1408-1418, February 1969.

[4] P. CHEVALIER, A. FERREOL, "On the virtual array concept for the fourth-order direction finding problem", *IEEE Trans. Signal Processing*, Vol. 47, No. 9, pp. 2592-2595, September 1999

[5] R. T. COMPTON, JR., "Adaptive Antennas—Concepts and Performance", Prentice Hall, Englewood Cliffs, N.J., 07632, 1988.

[6] M. C. DOGAN, J. M. MENDEL, "Applications of cumulants to array processing—Part I: Aperture extension and array calibration", *IEEE Trans. Signal Processing*, Vol. 43, No. 5, pp. 1200-1216, May 1995.

[7] A. FERREOL, P. CHEVALIER, "On the behavior of current second and higher order blind source separation methods for cyclostationary sources", *IEEE Trans. Signal Processing*, Vol. 48, No. 6, pp. 1712-1725, June 2000. Errata Vol. 50, No. 4, p 990, April 2002.

[8] A. FERREOL, P. CHEVALIER, L. ALBERA, "Higher order blind separation of non zero-mean cyclostationary sources", Proc. *EUSIPCO* 02, Toulouse, (France), pp. 103-106, September 2002.

[9] A. FERREOL, P. CHEVALIER, L. ALBERA, "Second order blind separation of first and second order cyclostationary sources—Application to AM, FSK, CPFSK and Deterministic sources", *IEEE Trans. Signal Processing*, Vol. 52, No. 4, pp. 845-861, April 2004.

[10] B. FRIEDLANDER, "A sensitivity analysis of the MUSIC algorithm", *IEEE Trans. Acou. Speech. and Signal Processing*, Vol. 38, No. 10, pp. 1740-1751, October 1990.

[11] P. McCULLAGH, "Tensor methods in Statistics", Chapman and Hall, Monographs on Statistics and applied Probability, 1987.

[12] A. PAULRAJ, T. KAILATH, "Eigenstructure methods for direction of arrival estimation in the presence of unknown noise field", *IEEE Trans. Acou. Speech and Sign. Proc.*, Vol. 34, No. 1, pp. 13-20, February 1986.

[13] B. PORAT, B. FRIEDLANDER, "Direction finding algorithms based on higher order statistics", *IEEE Trans. Signal Processing*, Vol. 39, No. 9, pp. 2016-2024, September 1991.

[14] R. O. SCHMIDT, "Multiple emitter location and signal parameter estimation", *IEEE Trans. Ant. Prop.*, Vol. 34, No. 3, pp. 276-280, March 1986.

[15] A. L. SWINDLEHURST, T. KAILATH, "A performance analysis of subspaced-based methods in the presence of model errors, Part I: The MUSIC algorithm", *IEEE Trans. Signal Processing*, Vol. 40, No. 3, pp. 1758-1773, July 1992.

The invention claimed is:

1. A method of identifying directions of arrival from a plurality of radiation sources to an antenna array having N antennas (N being an integer) by a processor using an estimator of circular cumulants of a predetermined even-order (2q, q being an integer equal to or greater than 2), the method comprising:

receiving signals by the N antennas and arranging the received signals into a plurality of sampled vectors x(t), "t" being the index denoting different sampled vector;

calculating an estimated cumulant matrix $\hat{C}_{2q,x}(l)$ for a cumulant matrix $C_{2q,x}(l)$ according to the sampled vectors x(t), where "l" referring to a predetermined cumulant ranking, and each component of $C_{2q,x}(l)$ being Cum $[x_{i_1}(t), \ldots, x_{i_q}(t), x_{i_{q+1}}(t)^*, \ldots, x_{i_{2q}}(t)^*]$ ($1 \leq i,j \leq N$) ($1 \leq j \leq 2q$);

decomposing the estimated matrix $\hat{C}_{2q,x}(l)$ into eigenelements, and calculating an estimate unit matrix $\hat{U}_{2q,n}(l)$ for an unit matrix $U_{2q,n}(l)$ of the eigenvectors of $C_{2q,x}(l)$;

calculating an estimated pseudo-spectrum $\hat{P}_{Music\text{-}2q(l)}(\theta,\phi)$ for a direction space $(\theta,\phi)$, $\hat{P}_{Music\text{-}2q(l)}(\theta,\phi)$ being defined as:

$$\hat{P}_{Music\text{-}2q(l)}(\theta, \varphi) \triangleq \frac{[a(\theta, \varphi)^{\otimes l} \otimes a(\theta, \varphi)^{*\otimes(q-l)}]^\dagger \hat{U}_{2q,n}(l) \hat{U}_{2q,n}(l)^\dagger [a(\theta, \varphi)^{\otimes l} \otimes a(\theta, \varphi)^{*\otimes(q-l)}]}{[a(\theta, \varphi)^{\otimes l} \otimes a(\theta, \varphi)^{*\otimes(q-l)}]^\dagger [a(\theta, \varphi)^{\otimes l} \otimes a(\theta, \varphi)^{*\otimes(q-l)}]}$$

$a(\theta,\phi)$ being a matrix comprising directional vectors of the radiation sources; and identifying the directions of arrival of the radiation sources according to local minimums of the pseudo-spectrum $\hat{P}_{Music\text{-}2q(l)}(\theta,\phi)$.

2. The method of claim 1, wherein the decomposition comprises estimating a rank of the matrix $\hat{U}_{2q,n}(l)$.

3. A method of identifying directions of arrival from a plurality of radiation sources to an antenna array having N antennas (N being an integer) by a processor using an estimator of circular cumulants of a predetermined even-order (2q, q being an integer equal to or greater than 2), the method comprising:

receiving signals by the N antennas and arranging the received signals into a plurality of sampled vectors x(t), "t" being the index denoting different sampled vector;

calculating an estimated cumulant matrix $\hat{C}_{2q,x}(l)$ for a cumulant matrix $C_{2q,x}(l)$ according to the sampled vectors x(t), where "l" referring to a predetermined cumulant ranking, and each component of $C_{2q,x}(l)$ being Cum $[x_{i_1}(t), \ldots, x_{i_q}(t), x_{i_{q+1}}(t)^*, \ldots, x_{i_{2q}}(t)^*]$ ($1 \leq i,j \leq N$) ($1 \leq j \leq 2q$);

decomposing the estimated matrix $\hat{C}_{2q,x}(l)$ into eigenelements, and calculating an estimate unit matrix $\hat{U}_{2q,n}(l)$ for an unit matrix $U_{2q,n}(l)$ of the eigenvectors of $C_{2q,x}(l)$;

calculating an estimated pseudo-spectrum $\hat{P}_{2q\text{-}Music(l)}(\theta,\phi)$ for a direction space $(\theta,\phi)$ according to direction vectors $a(\theta,\phi,p1)$ and $a(\theta,\phi,p2)$ in two polarizations p1 and p2, $\hat{P}_{2q\text{-}Music(l)}(\theta,\phi)$ being defined as:

$\hat{P}_{2q\text{-}Music(l)}(\theta,\phi)$
  $\triangleq \lambda_{min}[(A_{12,q,l}(\theta,\phi))^{-1} A_{12,q,l}(\theta,\phi)^\dagger \hat{U}_{2q,n}(l) \hat{U}_{2q,n}(l)^\dagger A_{12,q,l}(\theta,\phi)]$ $A_{12,q,l}(\theta,\phi)$ being a matrix defined as $A_{12,q,l}(\theta,\phi) \triangleq [a(\theta,\phi,p1), a(\theta,\phi,p2)]$, and $\lambda_{min}[X]$ referring to minimum eigenvalue of the matrix X; and identifying the directions of arrival of the radiation sources according to local minimums of the pseudo-spectrum $\hat{P}_{2q\text{-}Music(l)}(\theta,\phi)$.

4. The method of claim 3, further comprising:

calculating an estimated vector $\hat{\alpha}_{q,l}(p_i)$ for vector $\alpha_{q,l}(p_i)$ associated with one of the radiation sources i, $\alpha_{q,l}(p) \triangleq [\alpha(p)^{\otimes l} \otimes \alpha(p)^{*\otimes (q-l)}]$, and $\alpha(p)\triangleq[\alpha_1,\alpha_2]$, where a direction vector $a(\theta,\phi,p)=A_{12}(\theta,\phi)\alpha(\bar{p})$;

decomposing the estimated vector $\hat{\alpha}_{q,l}(p_i)$ into $2^{q^2}$ sub-vectors $\hat{\alpha}_{q,l,s}(p_i)$, $(1\leq s\leq q-2)$, such that $\hat{\alpha}_{q,l}(p_i)=[\hat{\alpha}_{q,l,1}(p_i)^T, \ldots, \hat{\alpha}_{q,l,(q-2)}(p_i)^T]^T$ and ranking the components of each sub-vector $\alpha_{q,l,s}(p_i)$ in a matrix $\hat{\Gamma}_{q,l,s}(p_i)$ such that $\hat{\Gamma}_{q,l,s}(p_i)[k,j]=\hat{\alpha}_{q,l,s}(p_i)[2(k-1)-j]$, where $\hat{\Gamma}_{q,l,s}(p_i)[k,j]$ and $\hat{\alpha}_{q,l,s}(p_i)[k]$ are the element $[k, jk]$ and the component $k$ respectively of the matrix $\hat{\Gamma}_{q,l,s}(p_i)$ and $\hat{\alpha}_{q,l,s}(p_i)$; and jointly diagonalizing the matrices $\hat{\Delta}_{q,l,s}(p_i)$, $(1\leq s\leq q-2)$ to obtain the estimate vector $\hat{\alpha}_{q,l}(p_i)$, where $\hat{\Delta}_{q,l,s}(p_i)$ is defined as:

$\hat{\Delta}_{q,l,s}(p_i)=\hat{\Gamma}_{q,l,s}(p_i)\hat{\Gamma}_{q,l,s}(p_i)^\dagger$ if $q-l=0$ $\hat{\Delta}_{q,l,s}(p_i)=\hat{\Gamma}_{q,l,s}(p_i)\hat{\Gamma}_{q,l,s}(p_i)^\dagger$ if $q-l=1$ $\hat{\Delta}_{q,l,s}(p_i)=\hat{\Gamma}_{q,l,s}(p_i)^*\hat{\Gamma}_{q,l,s}(p_i)^T$ if $q-l>1$.

5. The method of claim 3, wherein the decomposition comprises estimating a rank of the matrix $\hat{U}_{2q,n}(1)$.

6. A method of identifying directions of arrival from a plurality of radiation sources to an antenna array having N antennas (N being an integer) by a processor using an estimator of circular cumulants of a predetermined even-order (2q, q being an integer equal to or greater than 2), the method comprising:

receiving signals by the N antennas and arranging the received signals into a plurality of sampled vectors x(t), "t" being the index denoting different sampled vector;

calculating an estimated cumulant matrix $\hat{C}_{2q,xe}(1)$ for a cumulant matrix $C_{2q,xe}(1)$ of vector $x_e \triangleq [x(t)^T, x(t)^\dagger]^T$, according to the sampled vectors x(t), where "1" referring to a predetermined cumulant ranking;

decomposing the estimated matrix $\hat{C}_{2q,xe}(1)$ into eigenelements, and calculating an estimate unit matrix $\hat{U}_{2q,en}(1)$ for an unit matrix $U_{2q,en}(1)$ of the eigenvectors of $\hat{C}_{2q,ex}(1)$;

calculating an estimated pseudo-spectrum $\hat{P}_{Music-2q-rec(l)}(\theta,\phi,\Phi)$ for a direction space $(\theta,\phi)$ and phase space $\Phi$, $\hat{P}_{Music-2q-rec(l)}(\theta,\phi,\Phi)$ being defined as:

$$\hat{P}_{Music-2q-rec(l)}(\theta,\varphi,\phi) \triangleq \frac{[a_e(\theta,\varphi,\phi)^{\otimes l} \otimes a_e(\theta,\varphi,\phi)^{*\otimes(q-l)}]^\dagger \hat{U}_{2q,en}(l)\hat{U}_{2q,en}(l)^\dagger [a_e(\theta,\varphi,\phi)^{\otimes l} \otimes a_e(\theta,\varphi,\phi)^{*\otimes(q-l)}]}{[a_e(\theta,\varphi,\phi)^{\otimes l} \otimes a_e(\theta,\varphi,\phi)^{*\otimes(q-l)}]^\dagger [a_e(\theta,\varphi,\phi)^{\otimes l} \otimes a_e(\theta,\varphi,\phi)^{*\otimes(q-l)}]}$$

$a(\theta,\phi)$ being a matrix comprising directional vectors of the radiation sources; and identifying the directions of arrival of the radiation sources according to local minimums of the pseudo-spectrum $\hat{P}_{Music-2q-rec(l)}(\theta,\phi,\Phi)$.

7. The method of claim 6, wherein the decomposition comprises estimating a rank of the matrix $\hat{U}_{2q,en}(1)$.

8. A method of identifying directions of arrival from a plurality of radiation sources to an antenna array having N antennas (N being an integer) by a processor using an estimator of circular cumulants of a predetermined even-order (2q, q being an integer equal to or greater than 2), the method comprising:

receiving signals by the N antennas and arranging the received signals into a plurality of sampled vectors x(t), "t" being the index denoting different sampled vector;

calculating an estimated cumulant matrix $\hat{C}_{2q,xe}(1)$ for a cumulant matrix $C_{2q,xe}(1)$ of vector $x_e \triangleq [x(t)^T, x(t)^\dagger]^T$, according to the sampled vectors x(t), where "1" referring to a predetermined cumulant ranking;

decomposing the estimated matrix $\hat{C}_{2q,xe}(1)$ into eigenelements, and calculating an estimate unit matrix $\hat{U}_{2q,en}(1)$ for an unit matrix $U_{2q,en}(1)$ of the eigenvectors of $\hat{C}_{2q,ex}(1)$;

calculating an estimated pseudo-spectrum $\hat{P}_{Music-2q-rec(l)}(\theta,\phi)$ for a direction space $(\theta,\phi)$, $\hat{P}_{Music-2q-rec(l)}(\theta,\phi)$ being defined as:

$$\hat{P}_{2q-Music(l)}(\theta,\phi) \triangleq \lambda_{min}[(\tilde{A}_{e,q,l}(\theta,\phi)^\dagger \tilde{A}_{e,q,l}(\theta,\phi))^{-1} \tilde{A}_{e,q,l}(\theta,\phi)^\dagger \hat{U}_{2q,en}(l)\hat{U}_{2q,en}(l)^\dagger \tilde{A}_{e,q,l}(\theta,\phi)]$$

$\tilde{A}_{e,q,l}(\theta,\phi)$ being a matrix defined as $\tilde{A}_{e,q,l}(\theta,\phi)\triangleq[\tilde{A}_e(\theta,\phi)^{\otimes l} \otimes \tilde{A}_e(\theta,\phi)^{*\otimes(q-l)}]$, $\tilde{A}_e(\theta,\phi)\triangleq$ $$\tilde{A}_e(\theta,\varphi)\triangleq\begin{bmatrix} a(\theta,\varphi) & 0 \\ 0 & a(\theta,\varphi)^* \end{bmatrix},$$

$a(\theta,\phi)$ being a matrix comprising directional vectors of the radiation sources, and $\lambda_{min}[X]$ referring to minimum eigenvalue of the matrix X; and identifying the directions of arrival of the radiation sources according to local minimums of the pseudo-spectrum $\hat{P}_{Music-2q-rec(l)}(\theta,\phi)$.

9. The method of claim 8, further comprising:

calculating an estimated vector $\hat{\beta}_{q,l}(\Phi_i)$ for vector $\beta_{q,l}(\Phi_i)$ associated with one of the radiation sources i, $\beta_{q,l}(\Phi) \triangleq [\beta(\Phi)^{\otimes l} \otimes \beta(\Phi)^{*\otimes (q-l)}]$, and $\beta(\Phi)\triangleq[e^{j\Phi}, e^{-j\Phi}]^T$;

decomposing the estimated vector $\hat{\beta}_{q,l}(\Phi_i)$ into $2^{q^2}$ sub-vectors $\hat{\beta}_{q,l,s}(\Phi_i)$, $(1\leq s\leq q-2)$, such that $\hat{\beta}_{q,l}(\Phi_i)=[\hat{\beta}_{q,l,1}(\Phi_i)^T, \ldots, \hat{\beta}_{q,l,(q-2)}(\Phi_i)^T]^T$ and ranking the components of each sub-vector $\hat{\beta}_{q,l,s}(\Phi_i)$ in a matrix $\hat{\Gamma}_{q,l,s}(\Phi_i)$ such that $\hat{\Gamma}_{q,l,s}(\Phi_i)[k,j]=\hat{\beta}_{q,l,s}(\Phi_i)[2(k-1)-j]$, where $\hat{\Gamma}_{q,l,s}(\Phi_i)[k,j]$ and $\hat{\beta}_{q,l,s}(\Phi_i)[k]$ are the element $[k,j]$ and the component $k$ respectively of the matrix $\hat{\Gamma}_{q,l,s}(\Phi_i)$ and $\hat{\beta}_{q,l,s}(\Phi_i)$; and jointly diagonalizing the matrices $\hat{\Delta}_{q,l,s}(\Phi_i)$, $(1\leq s\leq q-2)$ to obtain the estimate vector $\hat{\beta}_{q,l}(\Phi_i)$, where $\hat{\Delta}_{q,l,s}(\Phi_i)$ is defined as:

$\hat{\Delta}_{q,l,s}(\Phi_i)=\hat{\Gamma}_{q,l,s}(\Phi_i)\hat{\Gamma}_{q,l,s}(\Phi_i)^\dagger$ if $q-l=0$ $\hat{\Delta}_{q,l,s}(\Phi_i)=\hat{\Gamma}_{q,l,s}(\Phi_i)\hat{\Gamma}_{q,l,s}(\Phi_i)^\dagger$ if $q-l=1$ $\hat{\Delta}_{q,l,s}(\Phi_i)=\hat{\Gamma}_{q,l,s}(\Phi_i)^*\hat{\Gamma}_{q,l,s}(\Phi_i)^T$ if $q-l>1$.

10. The method of claim 8, wherein the decomposition comprises estimating a rank of the matrix $\hat{U}_{2q,en}(1)$.

* * * * *